United States Patent [19]
Gutterman

[11] Patent Number: 4,527,432
[45] Date of Patent: Jul. 9, 1985

[54] DUAL FREQUENCY ACOUSTIC FLUID FLOW METHOD AND APPARATUS

[75] Inventor: Jeffrey S. Gutterman, Hilton, N.Y.

[73] Assignee: General Motors Corporation, Detroit, Mich.

[21] Appl. No.: 548,994

[22] Filed: Nov. 7, 1983

[51] Int. Cl.³ .............................................. G01F 1/66
[52] U.S. Cl. .................................................. 73/861.28
[58] Field of Search .......................... 73/861.27, 861.28

[56] References Cited

U.S. PATENT DOCUMENTS

| | | |
|---|---|---|
| 3,641,817 | 2/1972 | Dory . |
| 3,727,458 | 4/1973 | Parkinson . |
| 3,751,979 | 8/1973 | Ims . |
| 3,906,791 | 9/1975 | Lynnworth . |
| 4,011,755 | 3/1977 | Pedersen et al. . |
| 4,308,754 | 1/1982 | Pedersen et al. ................. 73/861.28 |
| 4,372,166 | 2/1983 | Loveland ........................ 73/861.28 |

OTHER PUBLICATIONS

Camac et al., "Absolute Distance Measurement by Variable Wavelength Interferometry", in Applied Optics, vol. 20, #3, 2/81, pp. 400-403.

Primary Examiner—Herbert Goldstein
Attorney, Agent, or Firm—Warren D. Hill

[57] ABSTRACT

An acoustic fluid flow meter determines the flow velocity or volumetric flow from a measurement of the phase shift of acoustic signals propagated upstream and downstream along an acoustical path in the fluid. High resolution measurements of the phase difference of transmitted and received signals represent the fractional wavelength which exceeds the integral number of waves along the acoustic path. The low resolution determination of the integral and fractional number of waves for each direction is made by measuring the fractional phase shift at one frequency of the acoustic signal and again at a slightly different frequency of the acoustic signal. The difference of those phase shift measurements is proportional to the number of waves along the path for a given direction of propagation. That value is combined with high resolution fractional phase shift measurement to obtain a high resolution total wave number value for each direction of propagation. The difference of those two values then is proportional to the fluid flow.

6 Claims, 5 Drawing Figures

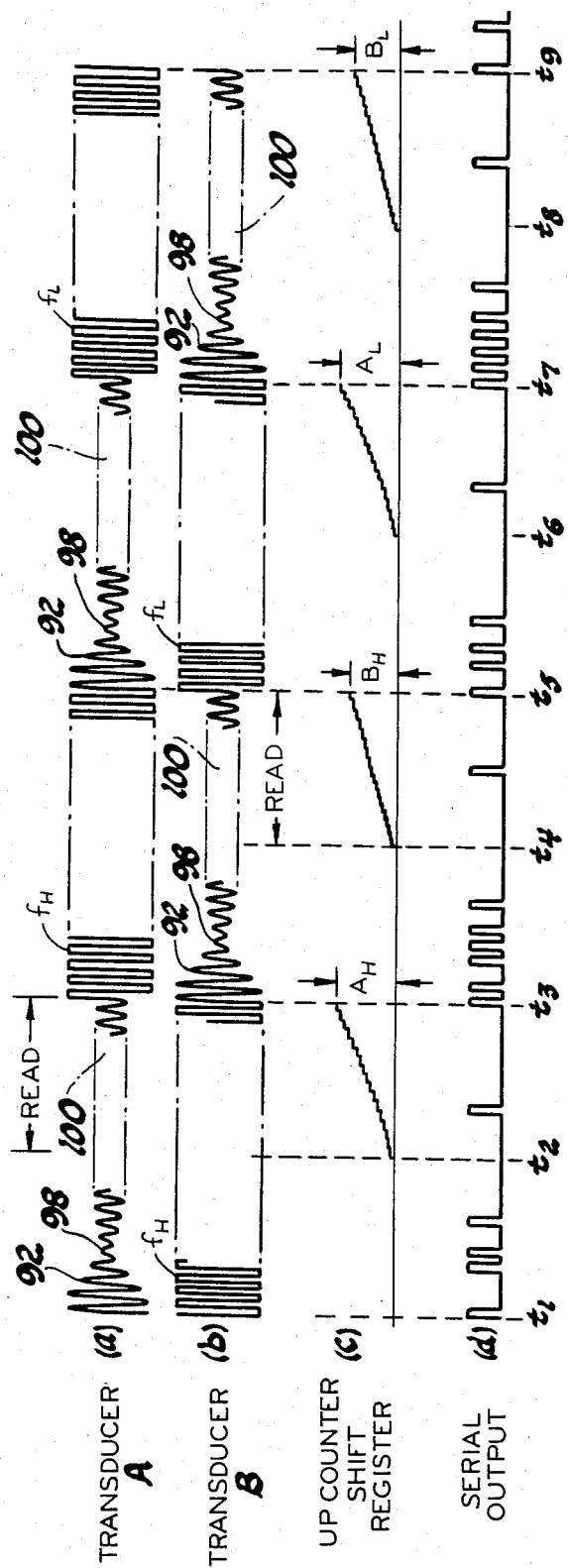
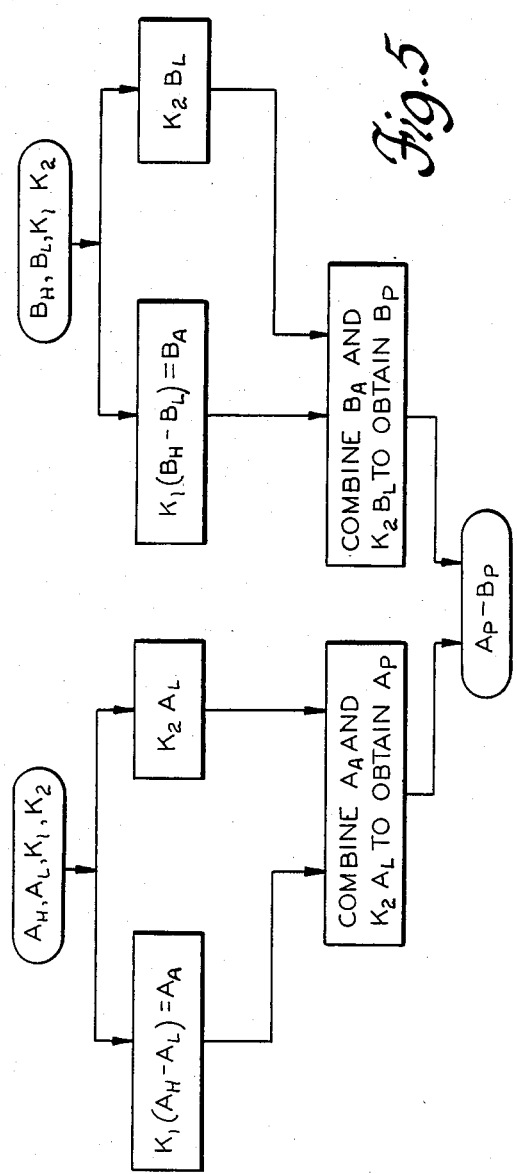

DUAL FREQUENCY ACOUSTIC FLUID FLOW METHOD AND APPARATUS

This invention relates to a method and apparatus for measuring a fluid flow and particularly to such method and apparatus utilizing acoustic signals sensitive to the flow being measured. For one type of fuel control for automotive engines it is desirable to measure mass air flow and such measurements must be made with high resolution and with fast response to any changes in the air flow. In other applications it is desirable to measure the flow of air or other gases or the flow of liquids to obtain information such as the speed of the fluid and the volumetric rate of flow.

In my copending patent application Method and Apparatus for Measuring Fluid Flow, Ser. No. 545,258, filed Oct. 25, 1983, some prior acoustic flow meters were described along with their drawbacks which primarily amounted to low measurement resolution and/or low response to fluid flow changes. According to the invention in that application upstream and downstream acoustic transducers adjacent a flow path are alternately energized by transmission signals having a long pulse train containing many wavelengths in the acoustic paths between the transducers to generate a received signal at the non-energized transducer, waiting for a delay period after initial signal transmission to allow the received signal to stabilize and then measuring the phase difference between the transmission signal and the received signal to determine the phase shifts for both upstream and downstream acoustic signal propagation, where the difference between the upstream and downstream phase shifts is a function of fluid flow through the passage.

This scheme results in very accurate and fast flow measurements and the measured phase shift difference is proportional to the fluid flow velocity provided that the flow rate is small enough that the phase shift difference is less than one wavelength and does not change direction. The circuit operation is extended beyond these limits by providing a rollover circuit that indicates when such a limit has been passed and additional circuitry which deduces from the history of the system operation the true total phase shift difference. The utilization of such a flow meter would be enhanced and its range of application extended if the full amount of the phase shift could be measured directly, independently of the history of operation, and without sacrificing the high resolution and fast response.

It is therefore an object of this invention to provide a method and apparatus for measuring the full phase shift attributable to fluid flow in an acoustic flow meter.

The method of the invention is carried out by propagating acoustic signals upstream and downstream through a fluid flow along an acoustic path between a pair of transducers in response to transmission signals comprising wave trains of one frequency and generating corresponding received signals, and then repeating the signal propagation at a second frequency close to the first frequency, measuring the phase shift between the transmission and received signals with high resolution to determine the fractional portion of the number of waves between the transducers, calculating a low resolution value of the number of waves between the transducers for each direction of propagation by subtracting the low frequency phase shift from the high frequency phase shift for each direction, combining the low resolution value with the measured high resolution value for each propagation direction to obtain a high resolution value of the number of waves between transducers in each direction, and finding the difference of the number of waves in each direction which is proportional to fluid flow.

The apparatus of the invention is carried out by providing upstream and downstream transducers defining an acoustic path through a fluid flow, a transducer energizing source for emitting transmission signals at two different closely spaced frequencies so that acoustic wave trains of both frequencies are propagated in both directions sequentially, a circuit for measuring the phase shift between transmitted and received signals, and a computer programmed to determine the difference of the phase shifts for the two frequencies in one direction and then the other direction and then to combine each of those differences with a phase shift measurement for the same direction, and finally to subtract one of the combined signals from the other to determine phase shift due to fluid flow.

The above and other advantages of the invention will become more apparent from the following description taken in conjuntion with the accompanying drawings wherein:

FIG. 4 is a set of waveforms illustrating operation of the circuit of FIG. 2, and FIG. 5 is a flow chart illustrating a computer program operation according to the invention.

The invention as described herein is applied to the measurement of volumetric airflow or mass airflow in the induction passage of an automotive engine to obtain the necessary data for engine fuel control, which data is required in real time so that any changes of airflow can result in immediate changes of fuel supply to meet rigorous control standards. The principles disclosed herein are not limited to such an application, however, since the fast response and very high resolution offered by this invention have much broader application and includes the flow measurement of gases other than air and the flow measurement of liquids as well.

Figure 1:
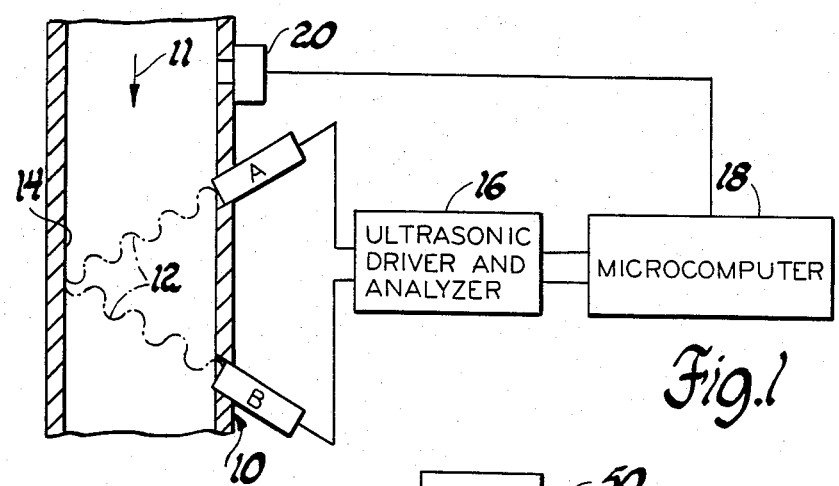
FIG. 1 is a diagrammatic view of a transducer arrangement in a flow passage coupled to circuitry constructed and operated according to the invention.

Referring to FIG. 1, a flow passage 10 contains in its wall a pair of electroacoustic transducers referred to as an upstream transducer A and a downstream transducer B. The terms "upstream" and "downstream" are relative to the arrow 11 indicating the usual flow direction, however, the instrument operates well for flow in either direction. The transducers are angularly positioned within the wall of the passage 10 so that an acoustic wave train 12 emitted from either transducer will, after reflection from a wall region 14, be transmitted to the other transducer. It is not essential that the reflection technique be employed, rather the transducer B, for example, may be located at the wall region 14 so that only a single pass of the wave train 12 occurs across the passage. It is important, however, that the frequency of the acoustic signal be such that many pulses or wavelengths occur along the acoustic path between the transducers. For example, the passage and transducer location may be so designed that there are nominally 16 wavelengths of the operating acoustic wavetrain between the transducers and the meter can be calibrated at a given flow rate (preferably zero flow) and temperature so that the transducer separation is exactly 16 wavelengths. Then any changes of flow rate will alter the wavelength so that the effective acoustic path changes by a fractional wavelength for small flow rates and by one or more wavelengths for higher flow rates. The circuit described herein, in effect, measures such wavelength changes to determine flow rate. An ultrasonic driver and analyzer circuit 16 is coupled to the transducers A and B to provide transmission signals for energizing the transducers alternately and to receive the output signals from the transducer which is receiving the acoustic energy.

Piezoelectric crystals are used as transducers and since each one acts as transmitter and receiver, they should have the same characteristics. To optimize the efficiency of the transducers, they are chosen with a resonant frequency near the operating frequency. If the resonant frequency is at the operating frequency, the crystals are at their minimum impedance and acoustic signal transmission will be optimized but acoustic signal reception will be minimal. By choosing an operating point slightly spaced in either direction from the resonant point, the crystals will have moderate impedance so that both transmission and reception are good. For example, a crystal having a resonant point at 39 kHz and an antiresonant point at 42 kHz with impedances of 500 ohms and 22,000 ohms, respectively, is preferably operated at about 43 kHz with 7,000 ohms impedance or at about 37 kHz at the same impedance. Operating in this manner, a transmitting signal of 10 volts peak-to-peak results in a received signal of 0.5 volts peak-to-peak. Any acoustic noise at frequencies far from the crystal resonance is effectively filtered since the crystal is essentially nonresponsive to such frequencies. In the application to automotive engines, there is relatively little noise generated in the region of 35 to 40 kHz but there is much noise below 20 kHz which is not sensed by the receiver.

The circuit 16 is shown in detail in FIG. 2 and, as will be described, is capable of not only driving the transducers and receiving signals from them but also analyzing the signals to determine the phase of the received signal relative to the transmission signal and to provide output signals relaying the phase information to a utilizing circuit 18 which preferably is in the form of a microcomputer programmed to derive from the phase information the desired fluid flow outputs. In the case of engine fuel control, the circuit 18 is an engine control module which is a microcomputer having many inputs other than airflow information for controlling engine operation, particularly the supply of fuel thereto. Since mass airflow is a principle element in the engine control algorithm, the air temperature and pressure are important inputs to the microcomputer. The phase information from the driver and analyzer circuit 16 contains the temperature information as well as the flow information. A separate pressure sensor 20 supplies pressure information to the microcomputer 18.

Figure 2:
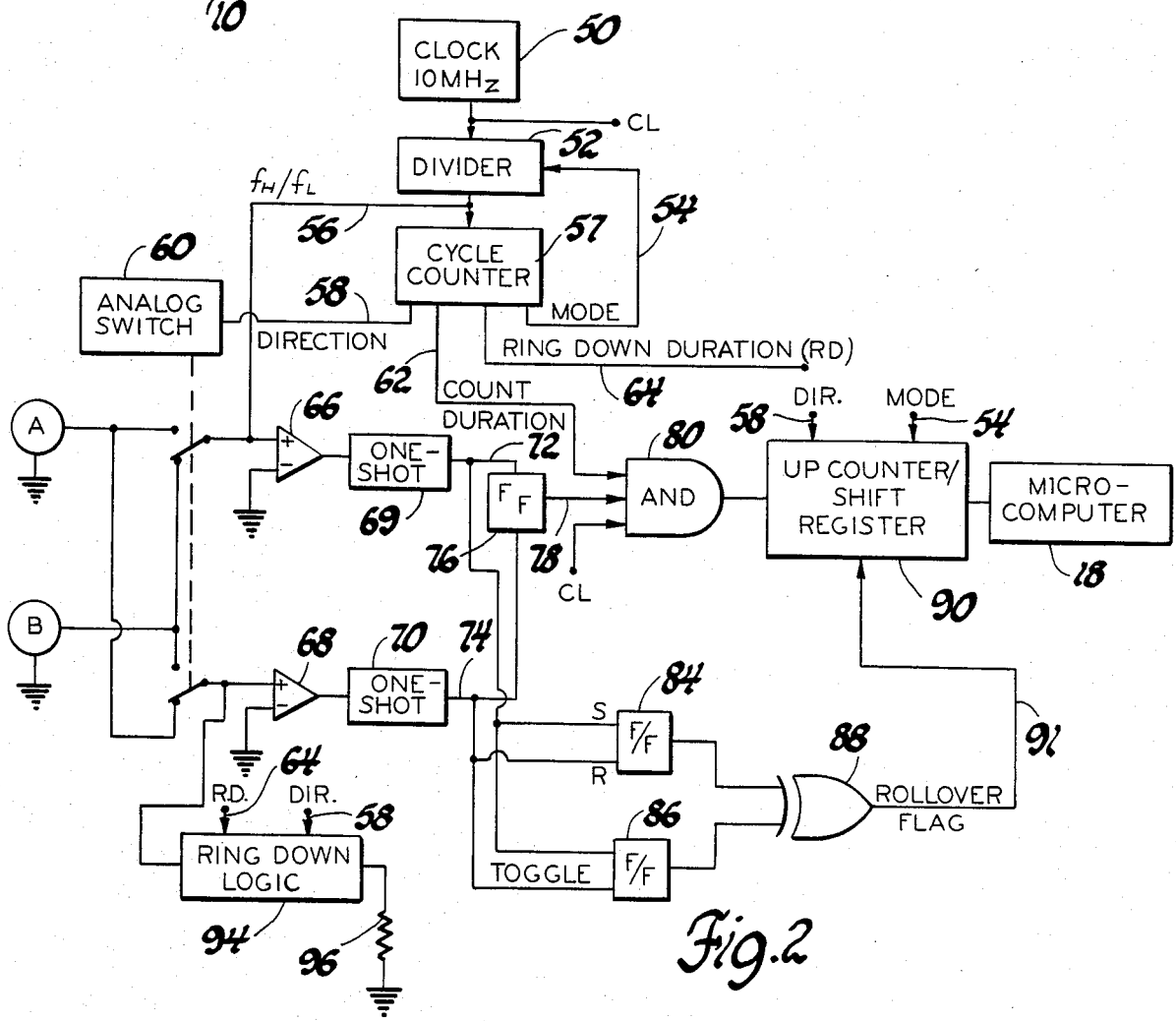
FIG. 2 is a circuit diagram of the circuit of FIG. 1 according to the invention.

Referring to FIG. 2, a clock 50 provides an output signal preferably at 10 MHz which is connected to the input of a divider circuit 52. The divisor of the divider circuit is variable in response to a signal on an input line 54 so that either of two frequencies $f_H$ or $f_L$ is output from the divider on line 56. The divider output then is the source of dual operating frequencies. The operating frequency is input to a cycle counter 57 which has several outputs having prescribed periods and prescribed relationships for controlling operations of various aspects of the circuit. A direction output on line 58 is connected to an analog switch 60 to control which transucer A or B is energized with a transmission signal thereby controlling the direction of acoustic signal propogation through the air passage. In this specification, the direction A is used with reference to upstream propagation as measured by the acoustic signals received at the upstream transducer A, and direction B refers to downstream propagation. It is preferred that the direction signal change state every 256 clock pulses. Another cycle counter output is count duration on line 62 which preferably changes state approximately in the middle and at the end of the direction pulse and lasts for at least 128 pulses. A mode output on line 54 begins when the upstream direction begins and extends for two direction periods or 512 pulses. This mode signal has the effect of toggling the divider circuit to change its output between the high and low operating frequency each time the upstream propagation begins. A ringdown duration pulse on line 64 occurs at each change of the direction signal and extends for about 16 pulses.

The divider output on line 56 is selectively connected through the analog switch 60 to the transducer A or B to effect acoustic signal transmission. The line 56 is also connected to the positive input of a comparator 66, the negative input being connected to ground so that the comparator issues a positive output pulse whenever the input goes from negative to positive thereby serving as a zero crossing detector. A second comparator 68 has its positive input connected through the analog switch to the transducer A or B which is receiving acoustic signals. The outputs of the comparators 66 and 68 are connected to one-shots 69 and 70, respectively, which in turn have their outputs connected by lines 72 and 74 to the set and reset inputs of a flip-flop 76. The time between the rising edges of the input signals to the flip-flop determine the pulse width of the flip-flop output on line 78 which is proportional to the difference in phase between the transmission signal input to the comparator 66 and the received signal input to the comparator 68. The flip-flop output on line 78 is fed to a three-input AND gate 80. A second input of the AND gate is the count duration line 62 from the cycle counter and the third input is from the 10 MHz clock 50. Thus, the AND gate output will be a series of pulses at 10 MHz in frequency in bursts lasting for the pulse width of the flip-flop 76 provided that the count duration signal is present. Thus, the number of pulses contained in each frequency burst from the AND gate is a measure of the phase difference between the transmission pulse and received pulse at the transducers.

Figure 3:
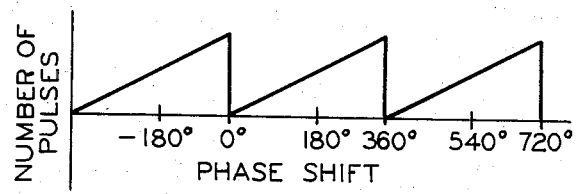
FIG. 3 is a graph illustrating the relationship betweeh phase shift and measured value thereof as determined by the circuit of FIG. 2.

As shown in FIG. 3, when the transducer pulses are in phase or at zero shift, the number of pulses output from the AND gate at each burst is zero and as the phase shift increases, the number of pulses increases until a phase shift of 360° is attained at which point a discontinuity occurs and the number of pulses drops to zero and again increases for phase shifts above 360°. Similarly, if the phase shift is in the other direction, that is, becomes less than zero, the number of pulses jumps to a high value and decreases as the phase shift further decreases from the zero point. Thus the number of pulses is a measure of phase difference and is directly proportional to phase shift only between 0° and 360°. A rollover circuit is used to indicate when such a discontinuity occurs and conditions the analyzing circuit to properly interpret the discontinuity. A flip-flop 84 has its set input connected to the line 72 which is triggered by the transmission signal and its reset input connected to the line 74 which is triggered by the received signal. A second flip-flop 86 has inputs connected to the lines 72 and 74 so that it will toggle, that is, change state each time a pulse occurs on either input line. The outputs of the flip-flops 84 and 86 are connected to an exclusive OR gate 88. When the transmission and received signals appear alternately during a continuous train of pulses, the flip-flop 84 and 86 will change state at the same time so that, for example, if both flip-flops are turned on and off simultaneously, their outputs are in phase and the exclusive OR 88 will have a low output. If, however, two transmission pulses occur in sequence without an intervening received pulse, the toggle flip-flop 88 will change state but the flip-flop 84 will not change state so that the flip-flop outputs will be out of phase and the exclusive OR will be turned on to produce a high output. The exclusive OR output occurs on line 91 and is termed a "roll over flag". The roll over occurs when there is the discontinuity where the phase shift goes beyond zero or a multiple of 360° so that the roll over flag is used to aid the circuit in recognizing that event.

The first pulses from the AND gate 80 are fed to an up counter/shift register 90 having as control inputs, the direction signal on line 58, the mode signal on line 54 and the roll over flag from the OR gate 88. Under control of the direction signal, the up counter counts the pulses in the input signal and at the change of state of the direction signal which indicates that signal reading for one direction of propagation has terminated, the counter value is transferred to the shift register whereupon it is serially output in binary form to the microcomputer 18. That binary signal represents the measured phase shift in one direction. The direction signal on line 58 is also effective to insert a direction bit in the serially output signal to identify each signal as A or B direction. The mode signal on line 54 is the signal which controls the frequency output of the divider 52 and it is effective to insert in the serial output a bit indicating high or low frequency operation. Thus, the microcomputer receives phase shift information $A_H$ and $A_L$ for upstream and downstream propagation at high and low frequencies $f_H$ and $F_L$ respectively, and corresponding phase shift information $B_H$ and $B_L$ for downstream propagation. The roll over flag to the up counter/shift register 90 has the effect of setting the counter output to zero if roll over occurs during a given count period. This prevents the averaging of high and low count rates representing, say 359° and 1° to obtain some spurious intermediate value by assuming a 0° value, which is a good approximation of the proper reading.

When a transducer is vibrating during transmission mode and is then switched to a receiving mode the vibrations continue for a time and produce ringing signals which gradually decay thereby rendering the transducer ineffective as a receiver during the beginning of its receiving mode. The ringing signals can last for a long time. However, to dampen the ringing, a ring down logic circuit 94 is effective to connect a damping resistor 96 between the input of the comparator 66 and ground which in effect couples the damping resistor 96 across the transducer which is set for receiving. The ring down logic circuit 94 is controlled by the direction signal on line 58 and the ring down duration signal on line 64. The ring down duration is typically 16 cycles so that each time the acoustic signal direction changes, as noted by the direction signal on line 58, the ring down logic circuit is effective to place the resistor 96 across the receiving transducer for a period lasting for 16 pulses. This assures that the ringing signal on the receiving transducer is quickly dissipated so that the ringing will not thereafter interfere with the sensing of the incoming acoustic pulses.

The circuit as thus far described is better explained with reference to FIG. 4. FIG. 4 is a series of waveforms illustrating the voltages occurring at the transducers A and B as shown on axes a and b, respectively, or they indicate the logic state or the number stored in various parts of the circuit at a given moment of time as depicted on axes c and d. FIG. 4 will be described in terms of a preferred embodiment having the dual frequency transmission signal being provided in pulse trains of 256 pulses, but for purposes of clarity a fewer number of pulses in each train is depicted. This same type of compromise for the sake of drawing clarity is continued throughout FIG. 4. In other words, the time scale is not strictly true, but the sequence of events occurring on the various axes illustrates the proper sequence of events in the circuit.

The square wave pulses at axis b illustrates the input voltage from the divider 52 to the transducer B, which occurs when the analog switch is in the condition illustrated in FIG. 2. The 256 pulse train extends from time $t_1$ to $t_3$ which covers a period of about 6.25 milliseconds. At time $t_3$, the analog switch changes state and the transducer B is no longer fed from the clock 50, however, ringing in the transducer crystal creates large voltage signals 92 which gradually decay. After a new train of acoustic pulses from the other transducer arrives at the transducer B, small output signals 98 are produced at transducer B which gradually increase in magnitude as the sensor begins to resonate in harmony with the incoming signals. Thereafter, the sensor output stabilizes and continues at a fairly constant amplitude. Preferably, the transmission signal driving the transducer is about 10 volts peak-to-peak. The received signal 100 reaches an amplitude of about 0.5 volts peak-to-peak and varies only in phase as caused by the effect of fluid flow changes on the acoustic signal propagation through the passage. Noise signals from extraneous sources can also cause some phase shifts in individual pulses. To avoid taking any measurements during the beginning of each receiving period when the ringing 92 and the received pulse build up 98 is occurring, the circuit is conditioned to ignore any pulses occurring during the first 128 pulses of the transmission wave train and then readings are made of the received pulses during the remaining 128 pulses in the transmission wave. In FIG. 2, the count duration signal on line 58 has a low value during the first 128 pulses of each transmission period (i.e., between $t_1$ and $t_2$ and between $t_3$ and $t_4$) to assure that the AND gate 80 is disabled thereby inhibiting the reading of any data. The count duration signal changes to a high value at $t_2$ and $t_4$ to allow reading of the phase difference between the transmission pulses at one transducer and the received pulses from the output of the other transducer. For example the signals 92 and 98 on axis 6 are ignored between times $t_3$ and $t_4$ and phase comparisons between the received signal 100 on axis b and the transmitted signal $f_H$ on axis a are read between times $t_4$ and $t_5$. As previously described, the zero crossing point of the transmission and received pulses triggers the comparator 64 and 66 which in turn control the one shots and the flip-flop 76 to enable the AND gate for a period proportional to the phase shift during which the 10 MHz clock pulses pass through the AND gate. It will thus be seen that as shown in axes a and b of FIG. 4, that the transducers A and B alternate as acoustic sources and receivers and that the upstream and downstream propagation velocities determine the relative phases of the transmission and received pulses.

The transmission signals from $t_1$ through $t_5$ are high frequency signals $f_H$, whereas, during the period $t_5$ through $t_9$, the transmission signals are low frequency signals $f_L$. Thus, the waveforms occurring during the low frequency mode are identical to those previously described in the high frequency mode and the frequencies are so close that the difference is not visually apparent. The axis C in FIG. 4 shows the incrementing count of the upcounter shift register 90 during each read period so that at the end of each period, it accumulates the value of $A_H$, $B_H$, $A_L$ or $B_L$, respectively. Following each such period as shown on axis d, that value is serially output in binary form carrying appropriate flag bits to denote the direction A or B and the frequency fH or $f_L$. For example the value of $A_H$ is emitted beginning at time $t_3$.

The microcomputer 18 is programmed to determine from the phase shift information the number of waves between the transducers along the acoustic path for the upstream and the downstream propagation directions and then to determine the difference of those wave number values, which difference is directly proportional to the velocity of the fluid flow. For upstream propagation the measured values $A_H$ and $A_L$ provide high resolution values of the fractional portion of the phase shift for high and low frequency operation. The low frequency value will be used for purposes of the present description, however, either of the values might be used. Since the system is designed to have an acoustic path many wavelengths long, the number of waves in the acoustic path is generally some integral number plus a fractional number. The value $A_L$ (when multiplied by a constant $K_2$) accurately represents the fractional value and in itself gives no information as to the integral number of waves. If, however, the operating frequency is slightly increased by some value, say X percent, then the measured fractional wave number will increase X percent times the number of waves along the acoustic path. Consequently, the difference between the high and low frequency phase shift measurements is proportional to the number of waves in the acoustic path. Mathematically the approximate number of waves $A_A$ is expressed as $A_A = K_1 (A_H - A_L)$ where $K_1$ is a constant. Similarly, the approximate number of waves Ba in the acoustic path for downstream propagation is $B_A = K_1 (B_H - B_L)$. These values, however, are low resolution values and by themselves are inadequate for some purposes. Where accurate measurements are needed, these values of the total number of waves in the propagation path do, however, provide the integral number of waves in the path and can be combined with the high resolution fractional value $K_2A_L$ or $K_2B_L$ to derive a high resolution value or precise value $A_p$ or $B_p$ for the total number of wavelengths for each direction. In the preferred embodiment, the divisor of the divider 52 alternates between 268 and 272 to provide operating frequencies of $f_H = 37.313$ kHz and $f_L = 36.764$ kHz. Using these frequencies, the expression $K_1 (A_H - A_L)$ yields the total number of waves in the acoustic path within 1/16th of a wavelength. The high resolution fractional value $K_2A_L$, however, is accurate to within 1/1000th of a wavelength. Thus, when these values are combined in the microcomputer, a high resolution value of the total number of waves is obtained. For example, if $A_A = 17.10$ waves and $K_2A_L = 0.026$, then the high resolution total value is 17.026. As a further example, if the low resolution total value is $A_A = 16.98$ waves and the high resolution value $K_2A_L = 0.026$, then the high resolution total value is 17.026 waves. The flowchart in FIG. 5 illustrates the computation process for determining the precise value of the difference in wave numbers from measured phase shifts.

The difference in the upstream and downstream number of waves $(A_p - B_p)$ is proportional to the fluid velocity and may be combined with an area flow determinant to yield volumetric flow or in the case of gaseous flow may be combined with temperature and pressure measurements to yield a mass flow rate. It will thus be seen that this invention provides an acoustic fluid flow measuring method and apparatus useful to obtain fluid flow information at a fast response time and high resolution and which is useful over a wide dynamic range of fluid flow.

The embodiments of the invention in which an exclusive property or privilege is claimed are defined as follows:

1. In an acoustic flow meter having a pair of acoustic transducers spaced along a fluid flow stream to define an acoustic path length of many acoustic wavelengths, the method of measuring fluid flow comprising the steps of:
alternately energizing the transducers to effect upstream and downstream propagation of acoustic waves,
measuring the number of wavelengths in the acoustic path for upstream propagation with sufficient accuracy to determine the nearest number of integral waves between the transducers,
precisely measuring the fractional wavelength by which the acoustic path length exceeds an integral number of waves for upstream propagation,
combining the measured values to obtain a first precise value for the number of waves between the transducers for upstream propagation,
performing the measuring and combining steps for downstream propagation to obtain a second precise value for the number of waves between the transducers for downstream propagation, and
subtracting the second precise value from the first precise value wherein the resulting wave number difference is representative of fluid flow.

2. In an acoustic flow meter having a pair of acoustic transducers mounted upstream and downstream respectively along a fluid flow stream to define an acoustic path length of many acoustic wavelengths, the method of measuring fluid flow comprising the steps of:
alternately energizing the transducers by a first frequency signal and then by a second frequency signal near the first frequency to effect upstream and downstream propagation of acoustic waves to produce received signals of two frequencies,
measuring the phase shift between the energizing signals and corresponding received signals to obtain high resolution phase shift measurements at each frequency for each direction of propagation, each phase shift measurement representing the fractional wavelength by which the acoustic path length exceeds an integral member of waves for a given direction of propagation and frequency, calculating the approximate number of wavelengths in the acoustic path accurate to a fraction of a wavelength for each propagation direction by comparing the measured phase shifts for the first and second frequencies for each direction of propagation, combining the phase shift measurement at the first frequency for each direction with the calculated number of wavelengths for the corresponding direction to obtain precise values for the number of waves in the acoustic path for upstream and downstream propagation, and calculating the difference of the two precise values wherein the resulting wave number difference represents the fluid flow.

3. In an acoustic fluid flow meter having a pair of acoustic transducers mounted upstream and downstream of a fluid flow and defining an acoustic path length at least several acoustic wavelengths long, the method of measuring fluid flow including the steps of:

energizing one of the transducers by a transmission signal at a first frequency to produce an acoustic pulse train in one direction and continuing longer than the propagation time between the transducers to drive the other transducer to produce a received signal of the first frequency, measuring the phase shift pulse by pulse between the transmission signal and received signal and accumulating the phase shift measurements during a measurement period beginning after the received signal has stabilized and continuing while the transmission signal is present, thereby producing a high resolution measurement of phase shift, reversing the roles of the transducers as sending and receiving transducers and repeating the phase shift measurements thereby obtaining phase shift measurements for both upstream and downstream acoustic signal propagation for the first frequency, repeating in both propagation directions the signal transmission and phase shift measurements at a second frequency close to the first frequency, subtracting the phase shift measurement for one propagation direction and one frequency from another in the same direction and at the other frequency to obtain a low resolution value proportional to the full integral and fractional number of waves between the transducers for that propagation direction, combining the said low resolution value for one direction and the high resolution measurement for the same direction to obtain a first high resolution representation of the number of waves between transducers for that direction, performing the subtracting and combining steps for measurements in the other direction to obtain a second high resolution representation of the number of waves between the transducers for the other propogation direction, and subtracting the first representation from the second representation to accurately determine the difference in the number of waves which represents the fluid flow.

4. An acoustic flow meter for measuring fluid flow in a flow passage comprising a pair of acoustic transducers spaced upstream and downstream respectively along the passage to define an acoustic path through the passage, the acoustic path length being several times the operating acoustic wavelength, means for generating a transmission signal alternating between a first frequency and a second frequency which is close to the first frequency, means effective at each frequency for applying the transmission signal to the transducers alternately and for energizing each transducer at a given frequency to effect acoustic signal propagation upstream and downstream, whereby received signals are output from each transducer in turn while not energized, means coupled to the transmission signal and to the received signal for measuring with high resolution the phase shift between those signals for each frequency in each direction and producing corresponding phase shift signals, and computer means for receiving and storing the phase shift signals, said computer means being programmed to (a) compare phase shift signals phase shift for different frequencies in each direction to obtain low resolution values representing the number of waves in the acoustic path for each propagation direction, (b) combine the phase shift measurement at the first frequency for each direction with the calculated low resolution number of waves for the same direction to obtain high resolution values for the number of waves in the acoustic path for upstream and downstream propagation, and (c) calculate the difference of the high resolution values for the number of waves in the acoustic path for the upstream and downstream directions, wherein the difference represents the fluid flow.

5. An acoustic flow meter for measuring fluid flow in a flow passage comprising a pair of acoustic transducers spaced upstream and downstream respectively along the passage to define an acoustic path through the passage, the acoustic path length being several times the operating acoustic wavelength, means for geneating a transmission signal alternating between a first frequency and a second frequency which is close to the first frequency, means effective at each frequency for applying the transmission signal to the transducers alternately and for energizing each transducer at a given frequency to effect acoustic signal propagation upstream and downstream each for a period longer than the propagation time over the acoustic path, whereby received signals are output from each transducer in turn while not energized, means coupled to the transmission signal and to the received signal for measuring pulse by pulse the phase shift between those signals, means for accumulating the phase shift measurements during measurements periods for each frequency in each direction and producing corresponding high resolution phase shift signals, and computer means for receiving and storing the phase shift signals, said computer means being programmed to (a) compare phase shift signals for different frequencies in each direction to obtain low resolution values representing the number of waves in the acoustic path for each propagation direction, (b) combine the phase shift measurement at the first frequency for each direction with the calculated low resolution number of waves for the same direction to obtain high resolution values for the number of waves in the acoustic path for upstream and downstream propagation, and (c) calculate the difference of the high resolution values for the number of waves in the acoustic path for the upstream and downstream directions, wherein the difference represents the fluid flow.

6. An acoustic flow meter for measuring fluid flow velocity in a flow passage comprising a pair of acoustic transducers spaced upstream and downstream respectively along the passage to define an acoustic path through the passage, the acoustic path length being several times the operating acoustic wavelength, means for generating a transmission signal alternating between a high frequency and a low frequency which is close to the high frequency, means effective at each frequency for applying the transmission signal to the transducers alternately and for energizing each transducer at a given frequency to effect acoustic signal propagation upstream and downstream, whereby received signals are output from each transducer in turn while not energized, means coupled to the transmission signal and to the received signal for measuring with high resolution the phase shift between those signals for each frequency in each direction and producing corresponding phase shift signals $A_H$ and $A_L$ for high and low frequencies respectively in the upstream direction and $B_H$ and $B_L$ for high and low frequencies respectively in the downstream direction, and computer means for receiving and storing the phase shift signals, said computer means being programmed to (a) compare phase shift signals for different frequencies in each direction to obtain low resolution values $A_A = K_1(A_H - A_L)$ and $B_A = K_1(B_H - B_L)$ (where $K_1$ is a constant), representing the number of waves within a fraction of a wavelength in the acoustic path for each propagation direction, (b) combine values $K_2 A_L$, $K_2 B_L$ at one frequency (where $K_2$ is a constant) for each propagation direction with the corresponding calculated low resolution number of waves $A_A$, $B_A$ respectively for the same direction to obtain high resolution values $A_p$ and $B_p$ for the number of waves in the acoustic path for upstream and downstream propagation respectively, and (c) calculate the difference $A_p - B_p$ of the high resolution values for the number of waves in the acoustic path for the upstream and downstream directions, wherein the difference is proportional to the fluid flow velocity.

* * * * *